United States Patent
Gaurav et al.

(10) Patent No.: US 7,865,531 B2
(45) Date of Patent: *Jan. 4, 2011

(54) METHOD AND SYSTEM FOR PROVIDING VALUE HELP FEATURES TO INPUT FIELDS GENERATED FOR DYNAMICALLY SELECTED COLUMNS

(75) Inventors: Vishal Gaurav, Jharkhand (IN); Manoj Gupta, West Bengal (IN); Aravinda Pantar, Karnataka (IN)

(73) Assignee: SAP AG, Walldorf (DE)

( * ) Notice: Subject to any disclaimer, the term of this patent is extended or adjusted under 35 U.S.C. 154(b) by 440 days.

This patent is subject to a terminal disclaimer.

(21) Appl. No.: 11/845,107

(22) Filed: Aug. 27, 2007

(65) Prior Publication Data

US 2009/0063442 A1 Mar. 5, 2009

(51) Int. Cl.
G06F 7/00 (2006.01)
G06F 17/30 (2006.01)

(52) U.S. Cl. ..................................... 707/802
(58) Field of Classification Search ........................ None
See application file for complete search history.

(56) References Cited

U.S. PATENT DOCUMENTS

| | | | |
|---|---|---|---|
| 5,515,488 A | 5/1996 | Hoppe et al. | |
| 6,772,150 B1 | 8/2004 | Whitman et al. | |
| 7,096,229 B2 | 8/2006 | Dettinger et al. | |
| 7,194,692 B2 | 3/2007 | Marcos et al. | |
| 2005/0278286 A1 | 12/2005 | Djugash et al. | |
| 2006/0265344 A1 | 11/2006 | Woods | |
| 2008/0104082 A1 | 5/2008 | Gimson et al. | |

OTHER PUBLICATIONS

U.S. Appl. No. 11/626,864; Non-Final Office Action mailed Nov. 20, 2008.
U.S. Appl. No. 11/626,867; Non-Final Office Action mailed Nov. 21, 2008.
U.S. Appl. No. 11/845,106; Non-Final Office Action mailed Aug. 17, 2009.
U.S. Appl. No. 11/617,718; Non-Final Office Action mailed Sep. 23, 2009.
U.S. Appl. No. 11/617,718; Final Office Action mailed Apr. 29, 2009.
U.S. Appl. No. 11/617,718; Non-Final Office Action mailed Oct. 28, 2008.

*Primary Examiner*—Uyen T. Le

(57) ABSTRACT

Described are methods and systems for providing value help features to input fields. In response to a user selection of a condition type, an associated metadata is retrieved. Based upon the metadata, a user interface element comprising a static key and a dynamic key is generated. The dynamic key includes a name field and a value input field. Based upon the user interface element, a generic query including an input parameter node and a result node is generated. For the name field and the value input field of the dynamic key, a sequence number indicating an associated attribute group is extracted from the metadata. Based upon a field type of the value input field, the user interface element is bound to the associated attribute group indicated by the sequence number. Based upon the user entry received at the value input field, a corresponding value help feature is displayed.

21 Claims, 8 Drawing Sheets

METHOD AND SYSTEM FOR PROVIDING VALUE HELP FEATURES TO INPUT FIELDS GENERATED FOR DYNAMICALLY SELECTED COLUMNS

TECHNICAL FIELD

Embodiments of the invention generally relate to computer systems, and more particularly, to a method and system for providing value help features to input fields generated for dynamically selected columns.

BACKGROUND

Since the dawn of the computer age, computers have evolved and become more and more powerful. In our present day, computers have become indispensable in many fields of human endeavor including engineering design, machine and process control, information storage and retrieval, and office computing. One of the primary uses of computers is for information storage and retrieval.

Database systems have been developed that allow a computer to store a large amount of information in a way that allows a user to search for and retrieve specific information in the database. For example, an insurance company may have a database that includes all of its policy holders and their current account information, including payment history, premium amount, policy number, policy type, exclusions to coverage, etc. A database system allows the insurance company to retrieve the account information for a single policy holder among the thousands and perhaps millions of policy holders in its database.

Retrieval of information from a database is typically done using queries. A query usually specifies conditions that apply to one or more columns of the database, and may specify relatively complex logical operations on multiple columns. The database is searched for records that satisfy the query, and the records are returned as query result.

Graphical querying interfaces have been developed that help a user to query a database by dynamically specifying search conditions. In this way, the user need not rely only upon a standard set of queries provided by an application. In addition, dynamically specifying search conditions enables the user to dynamically build queries based upon the most appropriate search conditions that may return the desired data. The user is typically provided with a means to dynamically select one or more columns of a database table upon which the user may like to execute a search. Once one or more columns are selected, the user is generally provided with input fields for each of the selected columns. The user may then fill in the input fields with the required search parameters and execute a search in the database to retrieve the required records.

Frequently, there is a need to provide value help features to help the user fill in values in the input fields. For example, if the user intends to fill in a name of a country in one of the input fields, it would be helpful to the user if a list of all the countries of the world is provided from which one or more countries may be selected. Two typical types of value help features are an Extended Value Selector (EVS) help and an Object Value Selector (OVS) help. The EVS help feature provides the user with a list of values from which the user may select one or more values to fill in an input field. The OVS help feature enables the user to execute another query for searching and retrieving one or more appropriate values to be filled in an input field.

The existing graphical query interfaces do not provide any value help features in the input fields for the dynamically selected columns to help the user in the selection of an appropriate value to be filled in an input field. Thus there is a need for a system that may provide one or more value help features in the input fields of the dynamically selected columns to enable easy selection of required values for filling up the input fields.

SUMMARY OF THE INVENTION

Embodiments of the invention generally directed to a method and system for providing value help features to input fields generated for dynamically selected columns. A user interface element is generated for a dynamic key from the metadata. The user interface element has a name field and a value input field. A generic query having an attribute group is provided. The attribute group includes a name attribute, a code value attribute and an identifier value attribute. A sequence number is extracted from the metadata. It is determined from the sequence number that whether the user interface element is to be bound to the attribute group or not. A field type of the dynamic key is determined from the metadata. The name field is bound to the name attribute. The value input field is bound to the code value attribute if the field type is a code type. The value input field is bound to the identifier value attribute if the field type is an identifier type. Determining a query descriptor from the metadata. The query descriptor includes a first input parameter node and a first result node. The first input parameter node has a first attribute. The query descriptor is copied to a dummy query. The dummy query includes a second input parameter node and a second result node. The first input parameter node is identical to the second input parameter node and the first result node is identical to the second result node. The second input parameter node includes a second attribute identical to the first attribute. A screen is generated from the dummy query. The screen has a first input field bound to the second attribute and a result table bound to the second result node. A second input field is populated with a value of the second attribute from the second result node.

These and other benefits and features of embodiments of the invention will be apparent upon consideration of the following detailed description of preferred embodiments thereof, presented in connection with the following drawings in which like reference numerals are used to identify like elements throughout.

BRIEF DESCRIPTION OF THE DRAWINGS

The claims set forth the embodiments of the invention with particularity. The embodiments of the invention, together with its advantages, may be best understood from the following detailed description taken in conjunction with the accompanying drawings. The invention is illustrated by way of example and not by way of limitation in the figures of the accompanying drawings. It should be noted that references to "an" or "one" embodiment in this disclosure are not necessarily to the same embodiment, and such references mean at least one.

DETAILED DESCRIPTION

Embodiments of the invention generally directed to a method and system for providing value help features to input fields generated for dynamically selected columns. A user interface element is generated for a dynamic key from the metadata. The user interface element has a name field and a value input field. A generic query having an attribute group is provided. The attribute group includes a name attribute, a code value attribute and an identifier value attribute. A sequence number is extracted from the metadata. It is determined from the sequence number that whether the user interface element is to be bound to the attribute group or not. A field type of the dynamic key is determined from the metadata. The name field is bound to the name attribute. The value input field is bound to the code value attribute if the field type is a code type. The value input field is bound to the identifier value attribute if the field type is an identifier type. Determining a query descriptor from the metadata. The query descriptor includes a first input parameter node and a first result node. The first input parameter node has a first attribute. The query descriptor is copied to a dummy query. The dummy query includes a second input parameter node and a second result node. The first input parameter node is identical to the second input parameter node and the first result node is identical to the second result node. The second input parameter node includes a second attribute identical to the first attribute. A screen is generated from the dummy query. The screen has a first input field bound to the second attribute and a result table bound to the second result node. A second input field is populated with a value of the second attribute from the second result node.

Figure 1:
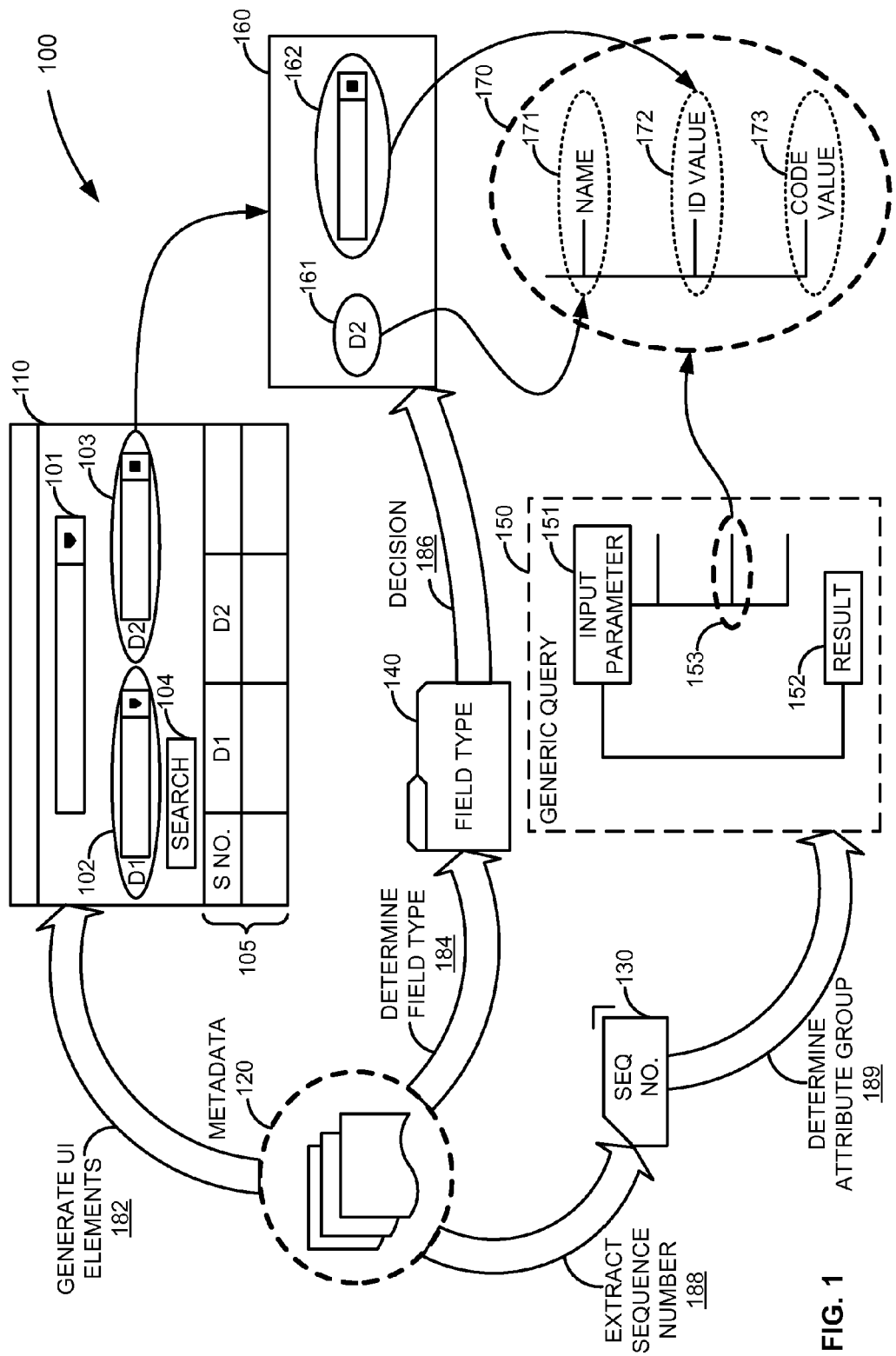
FIG. 1 is a functional block diagram of a system for providing value help features according to an embodiment of the invention.

FIG. 1 is a functional block diagram of a system 100 for providing value help features according to an embodiment of the invention. A backend system typically stores a number of condition types. According to one embodiment of the invention a condition type generally includes a number of semantic keys, each semantic key being associated with a column of a table stored in a database. Each condition type typically relates to a table in the database. According to an embodiment of the invention, the database is stored in the backend system. The semantic keys of a condition type may include one or more static keys and one or more dynamic keys. The static keys are usually common across a number of condition types. A set of dynamic keys is typically unique for a condition type.

According to an embodiment of the invention, user interface portal 110 enables a user to select one or more condition types from selectable list 101 of condition types. Selection of each option from selectable list 101 of condition types may retrieve metadata 120 relating to one or a group of condition types. Responsive to the user selecting one or a group of condition types from selectable list 101, a user selection is passed on to a query by group code. The query by group code is a logical query typically used for retrieving metadata for a number of semantic keys (including dynamic and static keys) from the database. The query by group code typically includes an input parameter node and a result node. The input parameter node generally provides a structure for query conditions upon which a search may be conducted. The result node generally provides a structure for storing results that are generated by executing the query by group code. The user selection from selectable list 101 is typically passed on as input parameters to the input parameter node of the query by group code. The query by group code is then executed to search the database based upon the input parameters. Metadata 120 of the semantic keys (including static and dynamic keys) for the selected condition types is retrieved as a result and stored in the result node of the query by group code. In one embodiment of the invention metadata 120 for each semantic key is stored as a separate record in the result node. Metadata 120 for each semantic key of a condition type may include a user interface type, name of a field, type of a field, label of a field, a tool tip or a sync code. User interface elements 102, 103, 104 and 105 are generated 182 for the semantic keys of the selected condition type from the retrieved metadata 120 stored in the result node and displayed to the user through user interface portal 110.

Generation of the user interface elements typically includes dynamically creating a form having name fields and value input fields for each semantic key and push buttons for performing tasks and dynamically associating the push buttons with actions. The tasks for which push buttons are created include clearing the fields, saving a query, deleting a query, modifying a query, generating database records, providing value help features and initiating a search based upon the values of the semantic keys. The push buttons may be associated with actions such as a mouse click or press of a button on a key board. User interface element 102 includes the name field having name D1 and a corresponding value input field for a first dynamic key. Similarly user interface element 103 includes the name field having name D2 and a corresponding value input field for a second dynamic key. User interface element 102 provides an extended value selector (EVS) help to enable the user to select one or more values from a list of values to be filled in the value input field of user interface element 102. User interface element 103 provides an object value selector (OVS) help to enable the user to execute a value query for searching and retrieving one or more appropriate values to be filled in the value input field of user interface element 103. Search push button 104 enables a user to search the database based upon the values in the value input fields of user interface elements 102 and 103. Table 105 typically displays the records retrieved from the database after the execution of a search by the user.

Generic query 150 typically includes input parameter node 151 and result node 152. Input parameter node 151 generally provides a structure for query conditions upon which a search may be conducted. Result node 152 generally provides a structure for storing results that are generated by executing generic query 150. The values in the value input fields generated in user interface portal 110 are typically passed on as input parameters to input parameter node 151 of generic query 150. Generic query 150 is then executed to search the database based upon the input parameters. The results of the search are retrieved and stored in result node 152 of generic query 150. Input parameter node 151 typically includes one or more attribute groups 153. According to an embodiment of the invention each attribute group 153 is associated to a global data type. The global data type is a formal description of the structural representation of data used by software programs. Actual data values can be seen as instances of (one or more) data types. In particular, a data type restricts the actual data values that can be represented as instances of this type. Each of the value help features such as the EVS help and the OVS help use one or more global data types as a set of data and provide the user with the set of data for value selection. Thus for a value input field to provide a value help feature such as the EVS help and the OVS help, the value input field is linked to a global data type representing the set of data used to provide the value help feature. Typically each pair of name field and value input field for a dynamic key is bound to an attribute group 153. The values in the value input fields of the pair are then passed to attribute group 153. For example, the name field and value input field of user interface element 103 may be bound to attribute group 153. A pair of name field and value input field is typically bound to an attribute group 153 that is associated to a global data type having the set of data required to provide the value help feature (EVS or OVS help) for the value input field.

Sequence number 130 is extracted 188 for each dynamic key from metadata 120. Sequence number 130 for the dynamic key indicates attribute group 153 to which the pair of the name field and value input field of the dynamic key in user interface element 102 or 103 is to be bound based upon the global data type associated with attribute group 153. Thus sequence number 130 is extracted 188 for each pair of name field and value field in user interface elements 102 and 103. The respective attribute groups 153 are determined 189 for the pairs of name field and value field in 102 and 103. According to an embodiment of the invention metadata 120 of the dynamic key includes a primary key uniquely identifying the dynamic key. Sequence number 130 is typically a part of the primary key.

170 shows a magnified view of attribute group 153. Attribute group 153 typically includes name attribute 171, identifier value attribute 172 and code value attribute 173. Name attribute 171 typically stores a name of a dynamic key in one of the name fields, such as name D1 of the first dynamic key and name D2 of the second dynamic key. Identifier value attribute 172 stores a value from a value input field providing the OVS help such as the value input field in user interface element 103. Code value attribute 173 stores a value from a value input field providing the EVS help such as the value input field in user interface element 102. Sequence number 130 is extracted from metadata 120.

A field type 140 is usually determined 184 to decide 186 whether a value input field is to be bound to either identifier value attribute 172 or code value attribute 173. Field type 140 typically may take two values, ID type or CODE type. If field type 140 is ID type, the input field is bound to identifier value attribute 172 of attribute group 153. Similarly if field type 140 is CODE type, the input field is bound to code value attribute 173 of attribute group 153. For example, field type 140 of the value input field in user interface element 103 providing an OVS help is determined 184 as ID type and decided 186 that the value input field in 103 is to be bound to identifier value attribute 172 of attribute group 153. 160 shows an enlarged view of user interface element 103. Name D2 in name field 161 is bound to name attribute 171 and value input field 162 is bound to identifier value attribute 172 of attribute group 153. Similarly field type 140 of the value input field in user interface element 102 providing EVS help is determined 184 as CODE type and decided 186 that the value input field in 102 is to be bound to code value attribute 173. The name field in 103 is bound to name attribute 171 and the value input field in 103 is bound to code value attribute 173. The values from the value input fields in 102 and 103 may then be passed to identifier value attribute 172 or code value attribute 173 of the respective attribute group 153. Generic query 150 may then be executed to retrieve desired results.

Figure 2:
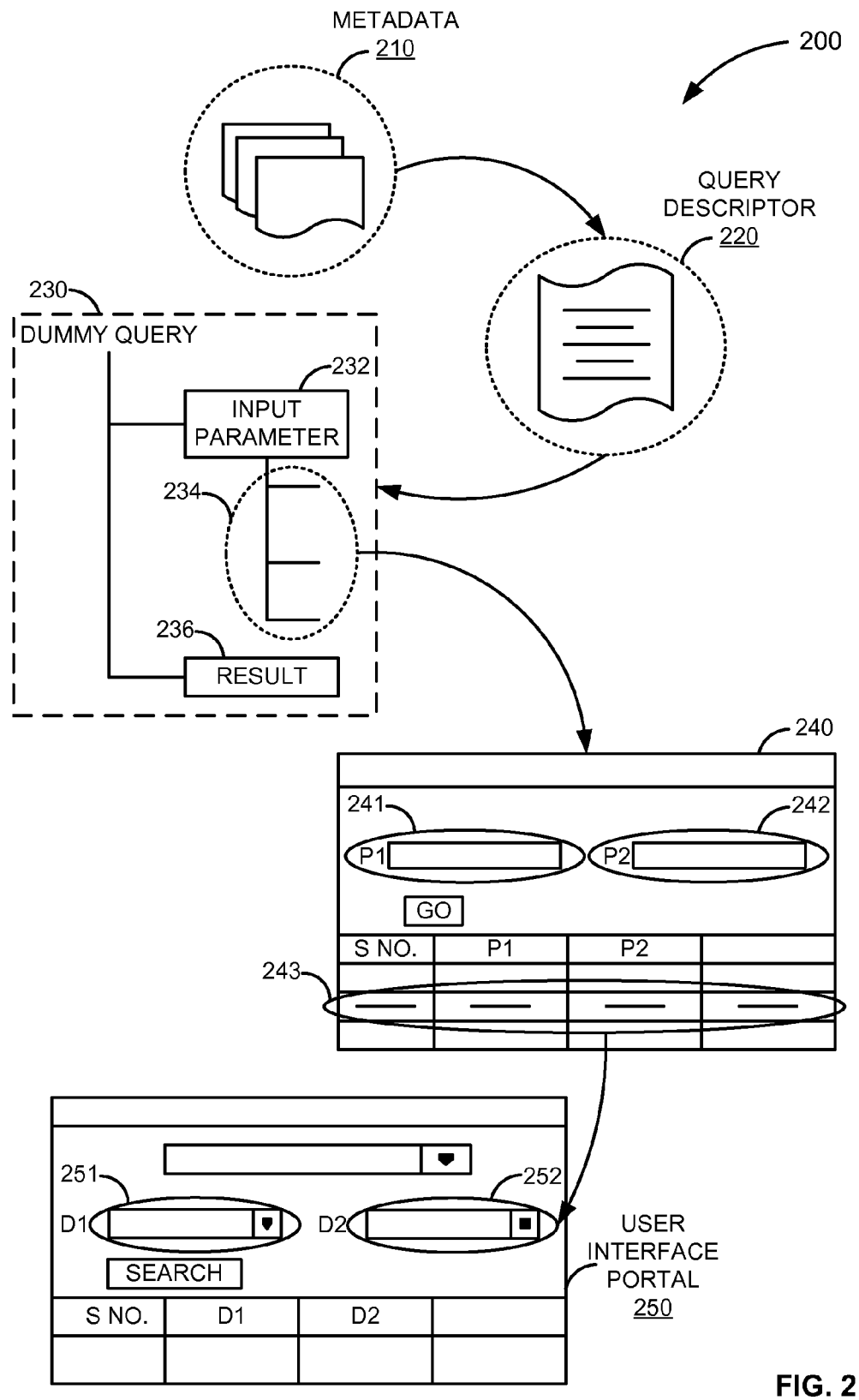
FIG. 2 is a functional block diagram of a system for providing object value selector (OVS) help according to an embodiment of the invention.

FIG. 2 is a functional block diagram of a system 200 for providing object value selector (OVS) help according to an embodiment of the invention. A query descriptor 220 is typically determined from metadata 210. Metadata 210 is typically retrieved for one or more dynamic keys. According to an embodiment of the invention for a value input field of the dynamic key providing OVS help, metadata 210 of the dynamic key typically includes four components including data object name, name space, node name and attribute name. Query descriptor is typically determined using the four components. Query descriptor 220 typically is the structure of a value query using which the user may search in a database for one or more required values to be filled in the value input field providing OVS help. Query descriptor 220 typically includes an input parameter node and a result node. The input parameter node of query descriptor 220 has one or more attributes, each of the attributes typically pointing to a set of data in the database. Query descriptor 220 is copied to dummy query 230. The structure of dummy query 230 is usually identical to that of query descriptor 220. Thus dummy query 230 has input parameter node 232 and result node 234 identical to the input parameter node and result node of query descriptor 220. All the attributes of query descriptor 220 are copied to input parameter node 232 of dummy query 230. According to an embodiment of the invention the user may select one or more attributes 236 from dummy query 230 for searching the database. Screen 240 is generated from dummy query 230 with each selected attribute from dummy query 230 having an input field 241 and 242. The user may fill in input fields 241 and 242 with values. The values are passed to the respective attributes in dummy query 230. Dummy query 230 may then be executed to search the database based upon the values of the attributes and retrieve results. The results are typically displayed in table 243 of screen 240. The user may now select any one of the retrieved results from table 243 to fill in one of the value input fields 251 and 252 of user interface portal 250. For example, result 244 is filled in as a value in input field 252 of user interface portal 250.

Figure 3:
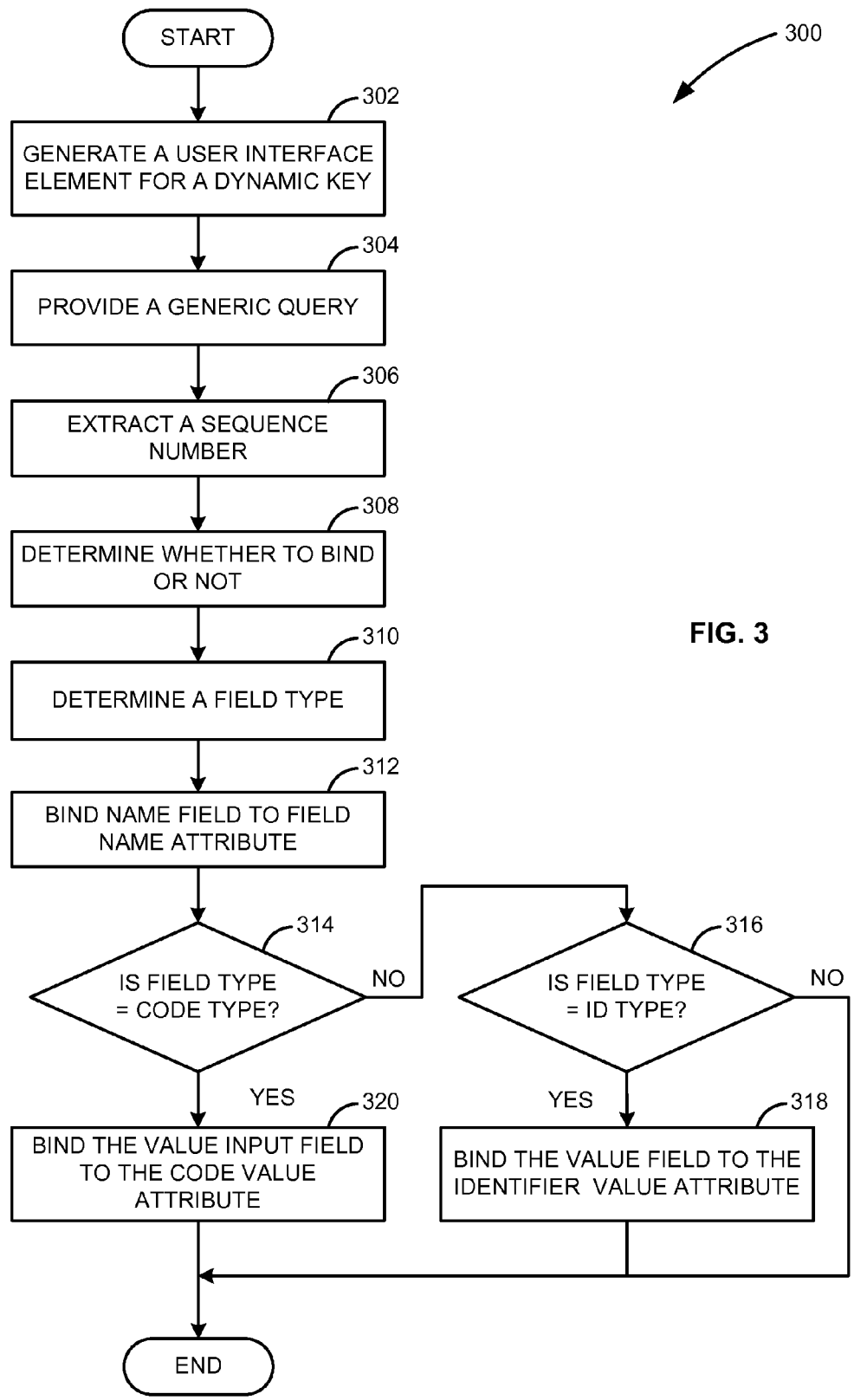
FIG. 3 is a flow diagram of a process for providing value help features according to an embodiment of the invention.

FIG. 3 is a flow diagram of a process 300 for providing value help features according to an embodiment of the invention. In process block 302, a user interface element is generated for a dynamic key from a metadata. The user interface element has a name field and a value input field. In process block 304, a generic query is provided. The generic query includes an attribute group. The attribute group further includes a name attribute, a code value attribute and an identifier value attribute. In process block 306, a sequence number is extracted from the metadata. In process block 308, it is determined from the sequence number whether the user interface element is to be bound to the attribute group or not. In process block 310, a field type of the dynamic key is determined from the metadata. In process block 312, the name field is bound to the name attribute. In decision block 314, if the field type is a CODE type, process 300 moves to process block 320 where the value input field is bound to the code value attribute and process 300 is terminated. In decision block 314, if the field type is not a CODE type, process 300 moves to decision block 316 where it is checked whether the field type is an ID type. If the field type is an ID type in decision block 316, process 300 moves to process block 318 where the value input field is bound to the identifier value attribute. In decision block 316, if the field type is not an ID type, process 300 is terminated.

Figure 4:
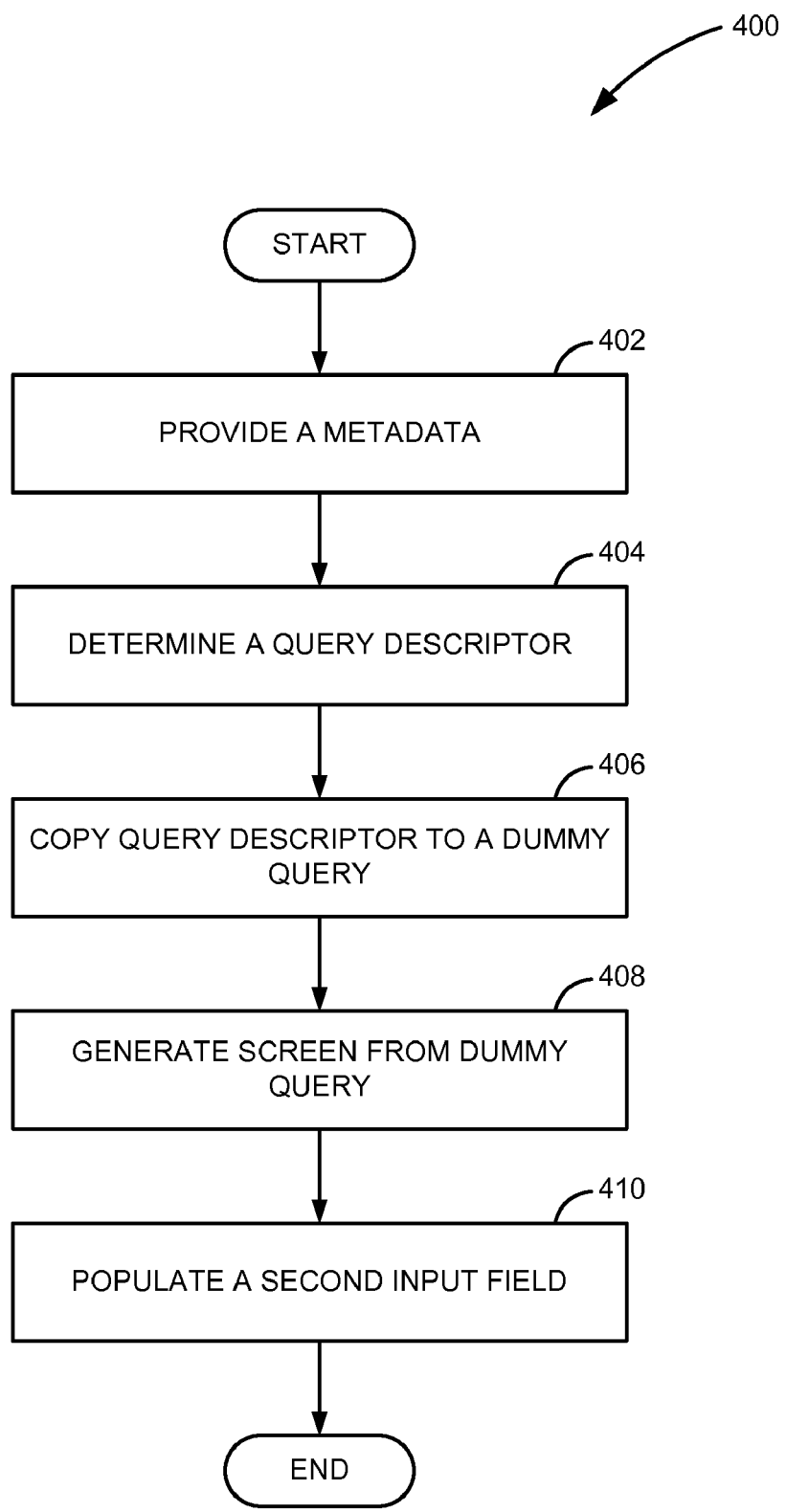
FIG. 4 is a flow diagram of a process for providing an object value selector (OVS) help according to an embodiment of the invention.

FIG. 4 is a flow diagram of a process 400 for providing an object value selector (OVS) help according to an embodiment of the invention. In process block 402, a metadata is provided. In process block 404, a query descriptor is determined from the metadata. The query descriptor includes a first input parameter node and a first result node. The input parameter node further includes a first attribute. In process block 406, the query descriptor is copied to a dummy query. The dummy query includes a second input parameter node and a second result node. The first input parameter node is typically identical to the second input parameter node and the first result node is typically identical to the second result node. The second input parameter node has a second attribute typically identical to the first attribute. In process block 408, a screen is generated from the dummy query. The screen typically includes a first input field bound to the second attribute. The screen further includes a result table bound to the second result node. In process block 410, a second input field is populated with a value of a result attribute from the second result node.

Figure 5:
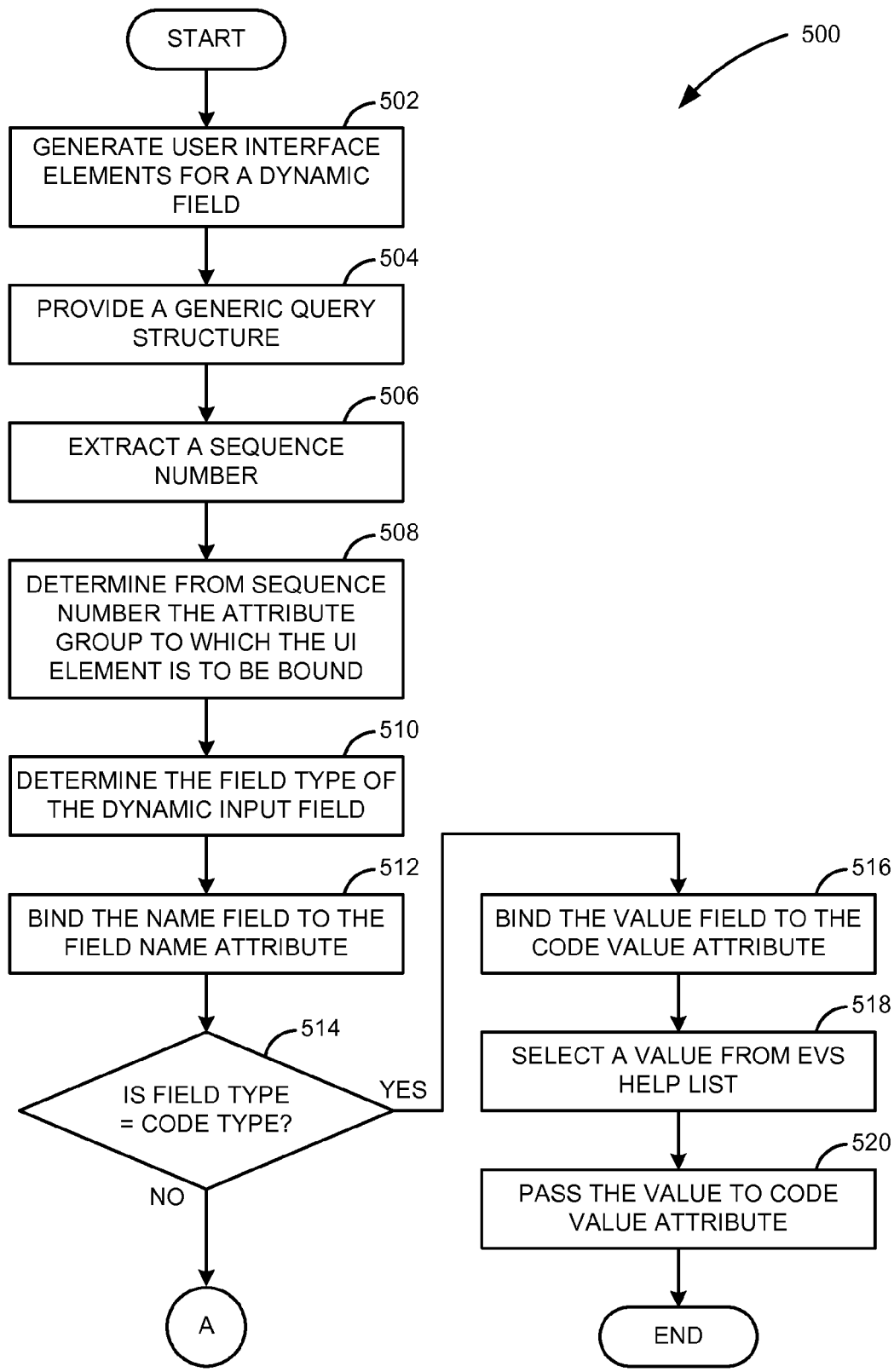
FIG. 5 is a first part of a flow diagram of a general process for providing value help features according to an embodiment of the invention.

FIG. 5 is a first part of a flow diagram of a general process 500 for providing value help features according to an embodiment of the invention. In process block 502, a user interface element is generated for a dynamic key using metadata of the dynamic key typically retrieved from a backend system. The user interface element typically includes a name field and a value input field. The value input field enables a user to fill in values for conducting a search in a database based upon the values. The value input field typically provides the user with a value help feature such as an EVS help or an OVS help. In process block 504, a generic query is provided. The generic query typically enables the user to conduct a search in the database based upon the values filled in the value input field. The generic query generally includes an input parameter node and a result node. The input parameter node further includes one or more attribute groups with each attribute group having a name field, a code value attribute and an identifier value attribute. In process block 506, a sequence number is extracted from the metadata. The sequence number typically identifies the attribute group to which the user interface element is to be bound to. Thus in process block 508, it is determined from the sequence number the attribute group to which the user interface element is to be bound to. In process block 510, a field type of the value input field is determined. The field type may take two values including CODE type and ID type. In process block 512, the name field is bound to the name attribute. In decision block 514, if the field type is the CODE type, process 500 moves to process block 516 where the value input field is bound to the code value attribute. In process block 518, a value is selected from an EVS help list typically by the user. The EVS help list generally includes one or more values from which the user may select a value for filling up the value input field. In process block 520, the value selected by the user is passed to the code value attribute. In decision box 514, if the field type is not the CODE type, process 510 moves to decision box 612 of the second part 600 of process 500 explained in the next paragraph.

Figure 6:
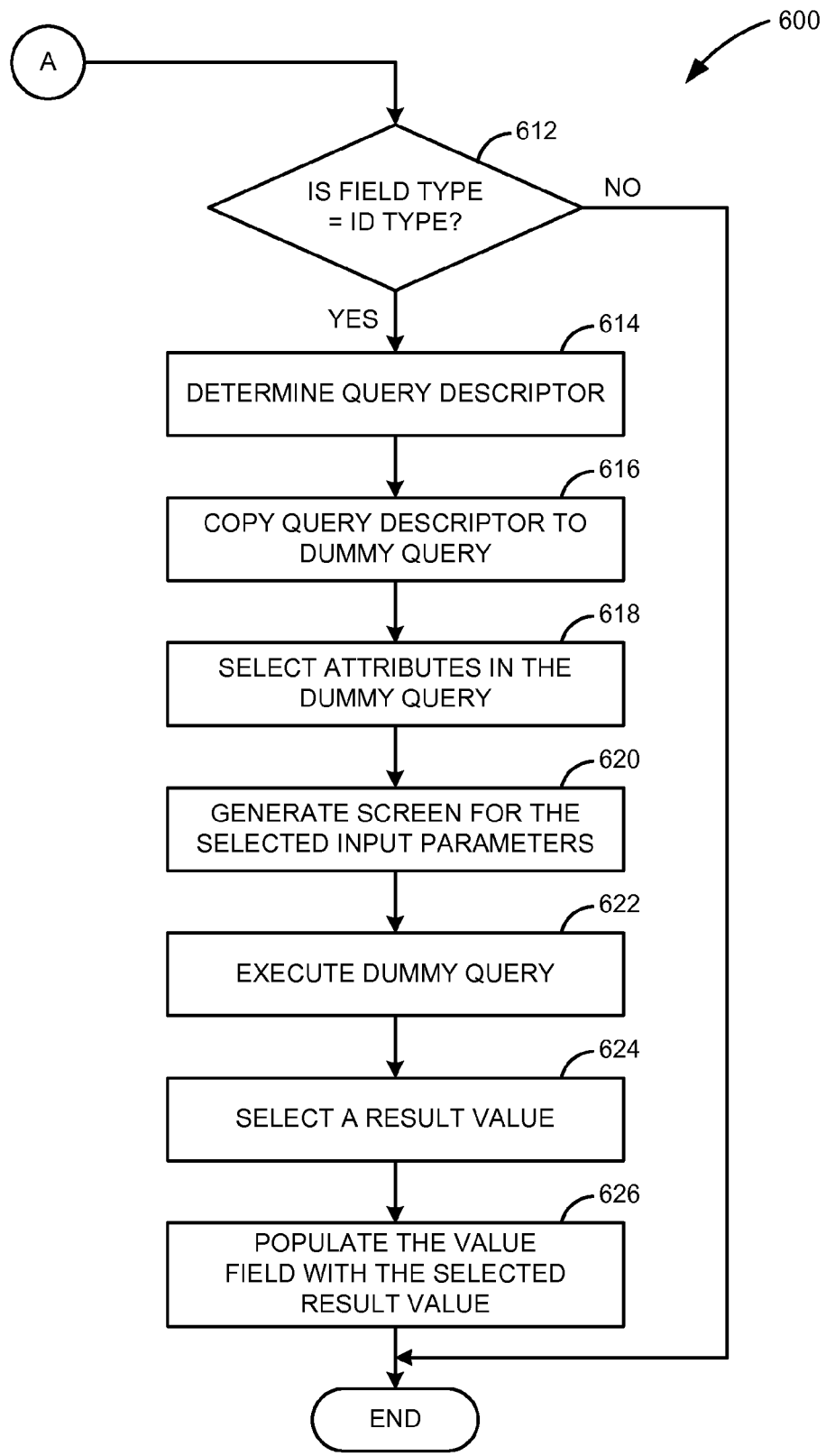
FIG. 6 is a second part of the flow diagram of FIG. 5 of a general process for providing value help features according to an embodiment of the invention.

FIG. 6 is a second part 600 of the flow diagram of FIG. 5 of a general process for providing value help features according to an embodiment of the invention. If the field type is not a CODE type, in decision box 514 as shown in FIG. 5, it is checked whether the field type is an ID type in decision box 612. If the field type is an ID type, process 600 moves to process block 614 where a query descriptor is determined. The query descriptor typically is the structure of a value query using which the user may search in a database for one or more required values to be filled in the value input field providing OVS help. The query descriptor typically includes an input parameter node and a result node. The input parameter node of the query descriptor has one or more attributes, each of the attributes typically pointing to a set of data in the database. In process block 616, the query descriptor is copied to a dummy query. The structure of the dummy query is usually identical to that of the query descriptor. Thus the dummy query has an input parameter node and a result node identical to the input parameter node and result node of the query descriptor. All the attributes of the query descriptor are copied to the input parameter node of the dummy query. In process block 618, the user selects one or more attributes from the input parameter node of the dummy query to be used for searching a database. In process block 620, a screen is generated from the dummy query with each selected attribute from the dummy query having an input field. The user may fill in the input fields with values. The values are passed to the respective attributes in dummy query. In process block 622, the dummy query is executed to search the database based upon the values of the attributes and retrieves results. The results are typically displayed in a table of the screen. In process block 624, the user selects one of the retrieved results from the table. In process block 626, the value selected by the user is populated in the value input field providing the OVS help. Process 600 is then terminated.

Figure 7:
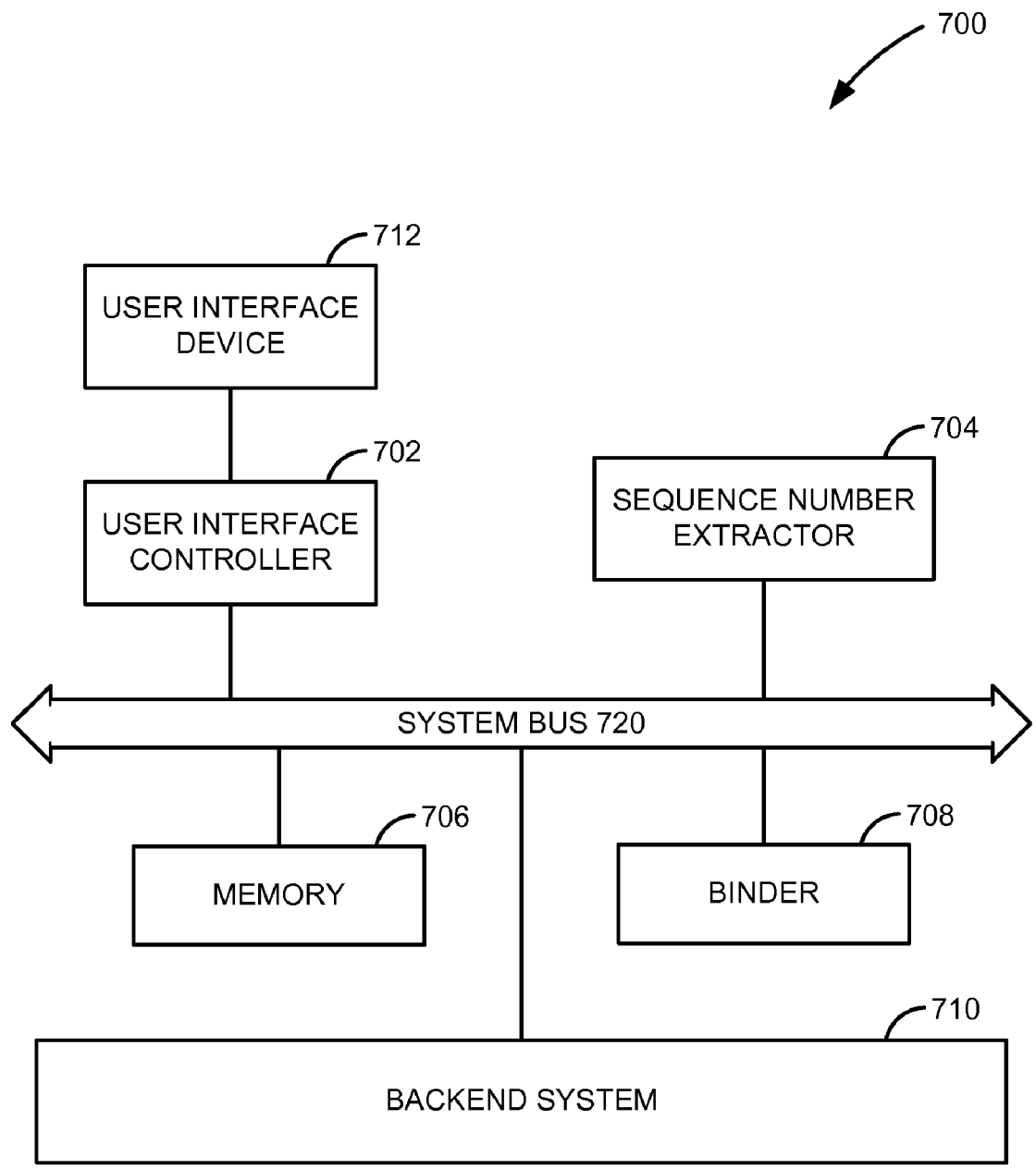
FIG. 7 is a block diagram of a system for providing value help features useful for implementing the invention according to an embodiment of the invention.

FIG. 7 is a block diagram of a system 700 for providing value help features useful for implementing the invention according to an embodiment of the invention. System 700 includes user interface controller 702, sequence number extractor 704, memory 706, binder 708 and backend system 710 all connected to each other through system bus 720. System 740 further includes user interface device 712 electronically coupled to user interface controller 704 enabling a user to interact with system. A user typically selects one or more condition types using user interface device 712. Upon the selection of one or more condition types by the user, metadata of one or more dynamic keys for the selected condition types is usually retrieved from backend system 710. User interface controller 702 typically generates a user interface element for each of the one or more dynamic keys the metadata generally. The user interface element generally includes a name field and a value input field. Memory 706 typically stores a generic query. The generic query generally includes one or more attribute groups. Each of the attribute groups further includes a name attribute, a code value attribute and an identifier value attribute. Sequence number extractor 704 extracts a sequence number and determines from the sequence number the attribute group to which the user interface element is to be bound to. Binder 708 determines a field type of the dynamic key from the metadata. The field type may take two values including CODE type and ID type. Binder 708 binds the value input field to the code value attribute if the field type is the CODE type and binds the value input field to the identifier value attribute if the field type is the ID type. Binder 708 further binds the name field to the name attribute.

Figure 8:
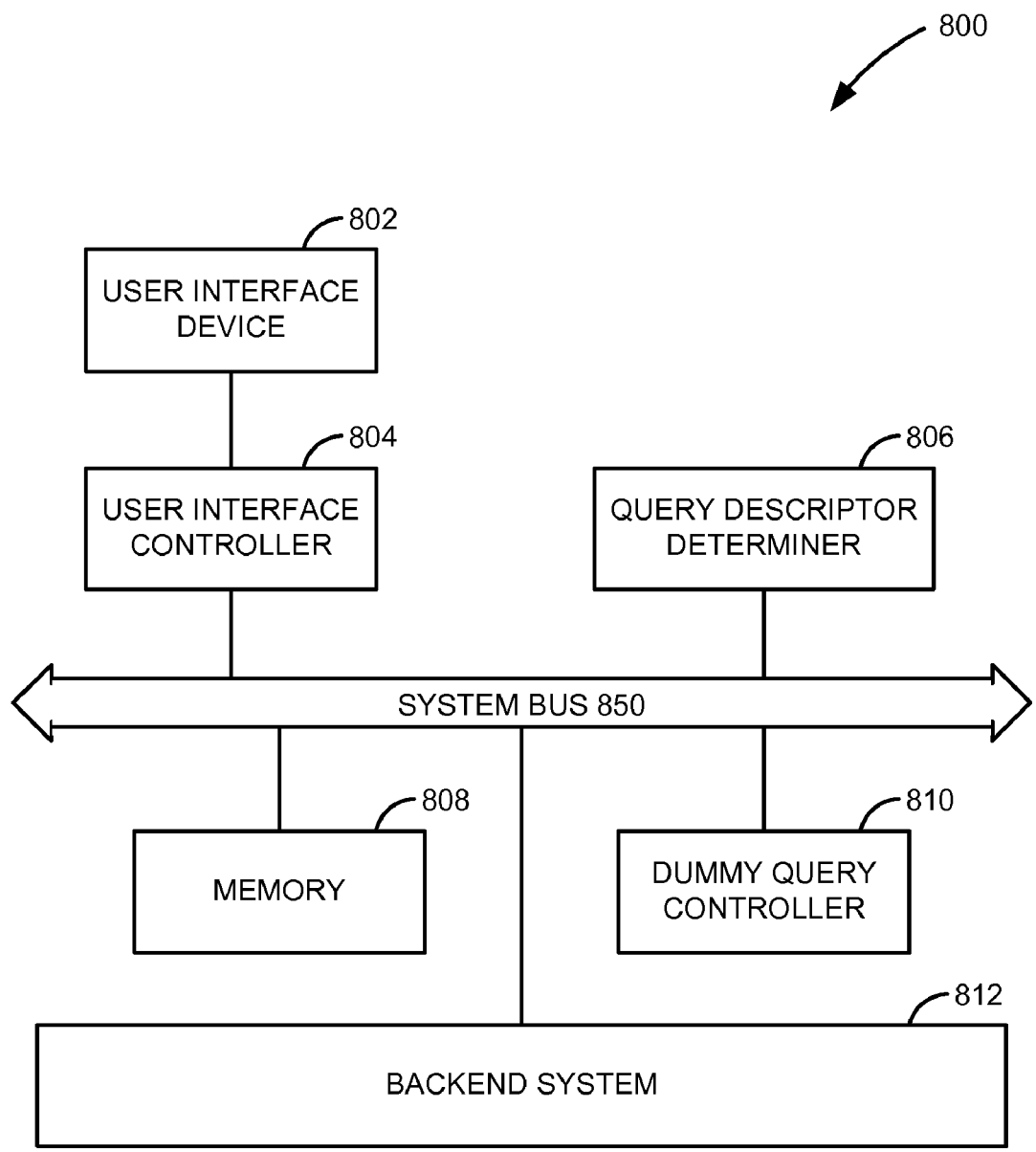
FIG. 8 is a block diagram of a system for providing an object value selector (OVS) help according to an embodiment of the invention.

FIG. 8 is a block diagram of a system 800 for providing an object value selector (OVS) help according to an embodiment of the invention. System 800 includes user interface controller 804, query descriptor determiner 806, memory 808, backend system 812 and dummy query controller 810 all connected to each other through system bus 850. User interface device 802 coupled to the user interface controller 804 enables a user to interact with system 800. Memory 808 stores a metadata typically retrieved from backend system 812. Query descriptor determiner 806 determines a query descriptor from the metadata. The query descriptor includes a first input parameter node and a first result node. The first input parameter node typically has a first attribute. Dummy query controller 810 copies the query descriptor to a dummy query typically stored in memory 808. The dummy query generally includes a second input parameter node and a second result node, the first input parameter node being identical to the second input parameter node and the first result node being identical to the second result node, the second input parameter node including a second attribute identical to the first attribute. User interface controller 804 generates a screen from the dummy query. The screen typically includes a first input field bound to the second attribute and a result table bound to the second result node. User interface controller 804 populates a second input field typically part of a user interface portal with a value of a result attribute from the second result node.

The particular methods associated with embodiments of the invention are described in terms of computer software and hardware with reference to flowcharts. The methods to be performed by a computing device (e.g., an application server) may constitute state machines or computer programs made up of computer-executable instructions. The computer-executable instructions may be written in a computer programming language or may be embodied in firmware logic. If written in a programming language conforming to a recognized standard, such instructions can be executed on a variety of hardware platforms and for interface to a variety of operating systems. In addition, embodiments of the invention are not described with reference to any particular programming language. It will be appreciated that a variety of programming languages may be used to implement the teachings of the invention as described herein. Furthermore, it is common in the art to speak of software, in one form or another (e.g., program, procedure, process, application, etc.), as taking an action or causing a result. Such expressions are merely a shorthand way of saying that execution of the software by a computing device causes the device to perform an action or produce a result.

Elements of the invention may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, other type of machine-readable media suitable for storing electronic instructions. The invention may be downloaded as a computer program which may be transferred from a remote computer (e.g., a server) to a requesting computer (e.g., a client) by way of a communication link (e.g., a modem or network connection).

What is claimed is:

1. A computer implemented method for displaying a value help feature to a value input field in a user interface, the method comprising:

in response to a user selection of a condition type, retrieving a metadata associated with the condition type from a database;

based upon the retrieved metadata, generating a user interface element in the user interface, the user interface element comprising a static key and a dynamic key, the dynamic key comprising a name field and the value input field;

based upon the user interface element, generating a generic query comprising an input parameter node and a result node, the input parameter node including an attribute group, the attribute group comprising a name attribute, a code value attribute and an identifier value attribute;

for the name field and the value input field of the dynamic key, extracting a sequence number from the retrieved metadata, the sequence number indicating an associated attribute group corresponding to the dynamic key;

based upon a field type of the value input field, binding the user interface element to the associated attribute group indicated by the sequence number, to pass a user entry received at the user interface to the generic query, by binding the name field of the user interface element to the name attribute, binding the value input field to the code value attribute if the field type of the value input field is a code type, and binding the value input field to the identifier value attribute if the field type of the value input field is an identifier type; and based upon the user entry received at the value input field, executing the generic query to display in the user interface, an extended value help if the field type of value input field is the identifier type and to display an object value help if the field type of the value input field is the code type.

2. The computer implemented method of claim 1, further comprising the steps of:

passing a value from the value input field to the code value attribute if the field type is code type; and passing the value from the value input field to the identifier value attribute if the field type is identifier type.

3. The computer implemented method of claim 1, wherein the attribute group is linked to a global data type.

4. The computer implemented method of claim 1, wherein generating a user interface element comprises:

creating a form including a name field and a value input field for each dynamic key;

creating one or more push buttons for performing a corresponding one or more tasks; and dynamically associating the push buttons with the tasks.

5. The computer implemented method of claim 4, wherein associating the push button with the tasks comprises associating the push button with an action from a group consisting of clearing a field, saving a query, deleting a query, modifying a query, generating database records, providing a value help feature and initiating a search based upon one or more values in the value input field.

6. An article of manufacture comprising a machine-accessible medium that provides instructions that, when executed by a machine, cause the machine to perform operations comprising:

in response to a user selection of a condition type, retrieving a metadata associated with the condition type from a database;

based upon the retrieved metadata, generating a user interface element in the user interface, the user interface element comprising a static key and a dynamic key, the dynamic key comprising a name field and the value input field;

based upon the user interface element, generating a generic query comprising an input parameter node and a result node, the input parameter node including an attribute group, the attribute group comprising a name attribute, a code value attribute and an identifier value attribute;

for the name field and the value input field of the dynamic key, extracting a sequence number from the retrieved metadata, the sequence number indicating an associated attribute group corresponding to the dynamic key;

based upon a field type of the value input field, binding the user interface element to the associated attribute group indicated by the sequence number, to pass a user entry received at the user interface to the generic query, by binding the name field of the user interface element to the name attribute, binding the value input field to the code value attribute if the field type of the value input field is a code type, and binding the value input field to the identifier value attribute if the field type of the value input field is an identifier type; and based upon the user entry received at the value input field, executing the generic query to display in the user interface, an extended value help if the field type of value input field is the identifier type and to display an object value help if the field type of the value input field is the code type.

7. The article of manufacture of claim 6 further providing instructions which when executed by the machine cause the machine to perform further operations comprising the steps of:

passing a value from the value input field to the code value attribute if the field type is code type; and passing the value from the value input field to the identifier value attribute if the field type is identifier type.

8. The article of manufacture of claim 6, wherein the attribute group is linked to a global data type.

9. A computing device operable for displaying a value help feature to a value input field in a user interface, comprising:

a user interface device operable for receiving a user selection of a condition type to retrieve a metadata associated with the condition type from a database;

a user interface controller operable for generating a user interface element in the user interface, the user interface element comprising a static key and a dynamic key from the retrieved metadata, the dynamic key comprising a name field and the value input field;

a memory electronically coupled to the user interface controller operable for storing a generic query comprising an input parameter node and a result node, the input parameter node including an attribute group, the attribute group comprising a name attribute, a code value attribute and an identifier value attribute;

a sequence number extractor electronically coupled to the memory and the user interface controller operable for extracting a sequence number for the name field and the value input field of the dynamic key, the sequence number indicating an associated attribute group corresponding to the dynamic key; and a binder electronically coupled to the memory, the user interface controller and the sequence number extractor operable for binding the user interface to the associated attribute group indicated by the sequence number based upon a field type of the value input field to pass a user entry received at the user interface element to the generic query, and for determining a field type of the value input field to execute the generic query based upon the user entry received at the value input field and to initiate the user interface controller to display an extended value help if the field type of the value input field is an identifier type, and to display an object value help if the field type of the value input field is a code type.

10. The computing device of claim 9, further comprising a backend system electronically coupled to the user interface controller, the memory, the sequence number extractor and the binder for:

providing the dynamic key, the metadata and a global data type, the attribute group being linked to the global data type; and generating the generic query based upon the user interface element.

11. The computing device of claim 9 wherein the binder is operable binding the user interface element to the associated attribute group by binding the name field of the user interface element to the name attribute, binding the value input field to the code value attribute if the field type of the value input field is a code type, and binding the value input field to the identifier value attribute if the field type of the value input field is an identifier type.

12. A computer implemented method for displaying an object value help feature to a value input field in a user interface, the method comprising:

in response to a user selection of a condition type, retrieving a metadata associated with the condition type from a database associated with the condition type from a database;

based upon the retrieved metadata, generating a user interface element in the user interface, the user interface element comprising a static key and a dynamic key, the dynamic key comprising a name field and the value input field;

determining a query descriptor from the metadata associated with the value input field, the query descriptor comprising a first input parameter node and a first result node, the first input parameter node comprising a first attribute;

copying the query descriptor to a dummy query by copying the first attribute of the query descriptor to a second input parameter node of the dummy query, the dummy query comprising the second input parameter node and a second result node, the second input parameter node comprising a second attribute, the dummy query including a structure identical to a structure of the query descriptor;

based upon a user selection of the second attribute of the second input parameter node in the dummy query, generating a screen from the dummy query, the screen comprising a first input field bound to the second attribute of the dummy query and a result table bound to the second result node of the dummy query;

passing a user entry provided on the first input field present on the screen to the first attribute present in the query descriptor for querying the database to retrieve data associated with the user entry;

displaying the retrieved data as one or more result values on the result table present on the screen to receive a user selection of a result value and populating the second result node of the dummy query with the result values; and updating the value input field with the selected result value and for the selected result value, displaying in the user interface, the object value help to the value input field by populating a second input field with a value from the second result node.

13. The computer implemented method of claim 12, wherein the metadata comprises a business object name, a name space, a node information and an attribute information.

14. The computer implemented method of claim 12, wherein the dummy query enables the selection of the second attribute.

15. The computer implemented method of claim 12 further comprising:
identifying a query by group code associated with the selected condition type; and
executing the query by group code to retrieve the metadata.

16. The computer implemented method of claim 12, wherein the dummy query including the structure identical to the structure of the query descriptor further comprises:
the second input parameter node of the dummy query being identical to the first input parameter node of the query descriptor;
the second result node of the dummy query being identical to the first result node of the query descriptor; and
the second attribute of the dummy query being identical to the first attribute of the query descriptor.

17. An article of manufacture comprising a machine-accessible medium that provides instructions that, when executed by a machine, cause the machine to perform operations comprising:
in response to a user selection of a condition type, retrieving a metadata associated with the condition type from a database associated with the condition type from a database;
based upon the retrieved metadata, generating a user interface element in the user interface, the user interface element comprising a static key and a dynamic key, the dynamic key comprising a name field and the value input field;
determining a query descriptor from the metadata associated with the value input field, the query descriptor comprising a first input parameter node and a first result node, the first input parameter node comprising a first attribute;
copying the query descriptor to a dummy query by copying the first attribute of the query descriptor to a second input parameter node of the dummy query, the dummy query comprising the second input parameter node and a second result node, the second input parameter node comprising a second attribute, the dummy query including a structure identical to a structure of the query descriptor;
based upon a user selection of the second attribute of the second input parameter node in the dummy query, generating a screen from the dummy query, the screen comprising a first input field bound to the second attribute of the dummy query and a result table bound to the second result node of the dummy query;
passing a user entry provided on the first input field present on the screen to the first attribute present in the query descriptor for querying the database to retrieve data associated with the user entry;
displaying the retrieved data as one or more result values on the result table present on the screen to receive a user selection of a result value and populating the second result node of the dummy query with the result values; and
updating the value input field with the selected result value and for the selected result value, displaying in the user interface, the object value help to the value input field by populating a second input field with a value from the second result node.

18. The article of manufacture of claim 17, wherein the metadata comprises a business object name, a name space, a node information and an attribute information.

19. The article of manufacture of claim 17, wherein the dummy query enables the selection of the second attribute.

20. A computing device operable for displaying an object value help feature to a value input field in a user interface, comprising:
a user interface device operable for receiving a user selection of a condition type to retrieve a metadata associated with the condition type from a database, to generate a user interface element in the user interface, the user interface element comprising for a static key and a dynamic key from the retrieved metadata, the dynamic key comprising a name field and a the value input field;
a memory operable for storing a metadata;
a query descriptor determiner electronically coupled to the memory operable for determining a query descriptor from the metadata associated with the value input field, the query descriptor comprising a first input parameter node and a first result node, the first input parameter node comprising a first attribute;
a dummy query controller electronically coupled to the memory and the query descriptor determiner operable for copying the query descriptor to a dummy query stored in the memory by copying the first attribute of the query descriptor to a second input parameter node of the dummy query, the dummy query comprising the second input parameter node and a second result node, the second input parameter node comprising a second attribute, the dummy query including a structure identical to a structure of the query descriptor; and
a user interface controller electronically coupled to the memory, the query descriptor determiner and the dummy query controller operable for generating a screen from the dummy query based upon a user selection of the second attribute of the second input parameter node in the dummy query, the screen comprising a first input field bound to the second attribute of the dummy query and a result table bound to the second result node of the dummy query, and for displaying the object value help to the value input field by populating a second input field with a value from the second result node.

21. The computing device of claim 20 wherein the user interface controller is operable for providing the object value help by:
passing a user entry provided on the first input field present on the screen to the first attribute present in the query descriptor for querying the database to retrieve data associated with the user entry,
displaying the retrieved data as one or more result values on the result table present on the screen to receive a user selection of a result value and populating the second result node of the dummy query with the result values, and
updating the value input field with the selected result value and for the selected result value, providing the object value help to the value input field by populating a second input field with a value from the second result node.

* * * * *